(12) United States Patent  
Kumar et al.

(10) Patent No.: US 12,545,121 B2  
(45) Date of Patent: Feb. 10, 2026

(54) SYSTEM AND METHOD FOR DETECTING AND MANAGING CONDUCTIVE GAPS

(71) Applicant: Transportation IP Holdings, LLC, Norwalk, CT (US)

(72) Inventors: Ajith Kuttannair Kumar, Ashburn, VA (US); Jeffrey John Wolff, Erie, PA (US); Henry Todd Young, Erie, PA (US); Haris Memic, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 200 days.

(21) Appl. No.: 18/474,182

(22) Filed: Sep. 25, 2023

(65) Prior Publication Data

US 2024/0131936 A1 Apr. 25, 2024  
US 2024/0227577 A9 Jul. 11, 2024

Related U.S. Application Data

(60) Provisional application No. 63/380,493, filed on Oct. 21, 2022.

(51) Int. Cl.
| | |
|---|---|
| *B60L 15/20* | (2006.01) |
| *B60L 5/00* | (2006.01) |
| *B60L 58/15* | (2019.01) |
| *G07C 5/00* | (2006.01) |

(52) U.S. Cl.  
CPC ............... *B60L 15/20* (2013.01); *B60L 5/00* (2013.01); *B60L 58/15* (2019.02); *G07C 5/006* (2013.01); *B60L 2240/423* (2013.01); *B60L 2240/461* (2013.01); *B60L 2240/547* (2013.01); *B60L 2240/647* (2013.01)

(58) Field of Classification Search  
None  
See application file for complete search history.

(56) References Cited

U.S. PATENT DOCUMENTS

| | | | |
|---|---|---|---|
| 8,528,487 B2 * | 9/2013 | Shapery | B60L 50/53 |
| | | | 191/22 R |
| 9,022,153 B2 * | 5/2015 | Tojima | B60L 3/0023 |
| | | | 180/167 |
| 11,014,453 B2 * | 5/2021 | Stark | B60L 5/30 |
| 11,874,314 B2 * | 1/2024 | Willey | B60L 3/12 |
| 12,054,056 B2 * | 8/2024 | Blase | B60L 5/04 |

(Continued)

FOREIGN PATENT DOCUMENTS

| | | |
|---|---|---|
| DE | 102019214870 A1 | 12/2020 |
| DE | 102020212067 A1 | 3/2022 |

OTHER PUBLICATIONS

European Search Report dated Feb. 16, 2024 for corresponding European Patent Application No. 23201151.0.

*Primary Examiner* — Todd Melton  
(74) *Attorney, Agent, or Firm* — K&L Gates LLP

(57) ABSTRACT

A system and method detect and manage conductive gaps between collector devices onboard vehicles and conductive pathways extending along routes traveled by the vehicles. The collector devices are conductively couplable to the conductive pathways. The system and method respond to a detected drop in an amount of electric current being conducted from the conductive pathway to the collector device of a vehicle with a responsive action prior to or during a subsequent drop in voltage being conducted from the conductive pathway to the collector device.

18 Claims, 4 Drawing Sheets

(56) References Cited

U.S. PATENT DOCUMENTS

2013/0126251 A1* 5/2013 Ruth .................. B60L 9/00
                                             903/902
2021/0086804 A1   3/2021 Otsubo

* cited by examiner

SYSTEM AND METHOD FOR DETECTING AND MANAGING CONDUCTIVE GAPS

CROSS-REFERENCE TO RELATED APPLICATIONS

This application is a non-provisional conversion of, and claims priority to, U.S. Provisional Patent Application No. 63/380,493, which was filed on Oct. 21, 2022, and the entire disclosure of which is incorporated herein by reference.

BACKGROUND

Technical Field

Embodiments of the inventive subject matter described herein relate to managing operations of vehicles that receive electrical power from conductive pathways that extend along routes traveled by the vehicles.

Discussion of Art

Some vehicles include collector devices that are conductively couplable to electrically conductive pathways that extend along routes traveled by the vehicles. For example, the conductive pathway may be a catenary line, an electrified rail, or the like, and the collector device may be a pantograph, a conductive shoe, or the like. Through an electrical connection between the collector device and the conductive pathway, electrical power can be transferred between the vehicle and an off-board power source. For example, the vehicle may receive electrical power from the conductive pathway and use the electrical power that is received to propel movement of the vehicle along the route.

Some vehicles with collector devices may experience conductive gaps between the collector device and the conductive pathway during operation of the vehicle. The conductive gap represents a section of the conductive pathway in which there is a significant reduction or entire absence of electrical power being transferred between the collector device of the vehicle and the conductive pathway. Without power from the conductive pathway, the conductive gap could force a temporary or complete shutdown of the vehicle, could degrade control of vehicle movement, could potentially damage the collector device and/or power circuitry, and/or could potentially damage the conductive pathway. It may be desirable to have a system and method that differs from those that are currently available.

BRIEF DESCRIPTION

In accordance with an example or aspect, a method is provided for a system having a conductive pathway extending along a route traveled by a vehicle and a collector device onboard the vehicle that is conductively couplable to the conductive pathway. The method may include responding to a detected drop in an amount of electric current being conducted from the conductive pathway to the collector device with a responsive action prior to or during a subsequent drop in voltage being conducted from the conductive pathway to the collector device.

In accordance with an example or aspect, a method is provided for a system having a conductive pathway extending along a route traveled by a vehicle and a collector device onboard the vehicle that is selectively conductively couplable to the conductive pathway. The method may include monitoring electric current conducted from the conductive pathway to the collector device, and detecting a conductive gap in the conductive pathway based on a drop in the electric current that is monitored.

In accordance with an example or aspect, a system is provided that includes a collector device and one or more processors. The collector device may be disposed onboard a vehicle that travels along a route and may be conductively couplable to a conductive pathway extending along the route. The one or more processors may detect a drop in an amount of electric current being conducted from the conductive pathway to the collector device and respond to the drop in the amount of electric current with a responsive action prior to or during a subsequent drop in voltage being conducted from the conductive pathway to the collector device.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
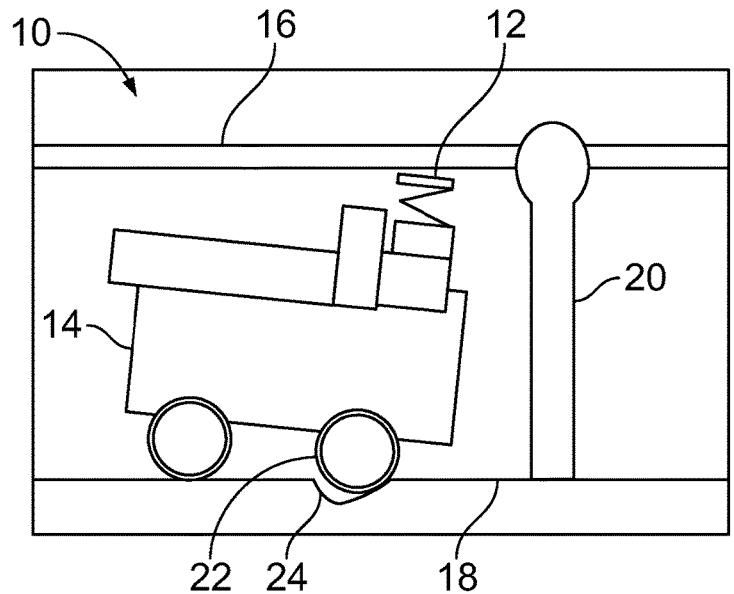
FIG. 1 illustrates a power transfer system that includes a collector device onboard of a vehicle and a conductive pathway.

Embodiments of the subject matter described herein relate to detecting, responding to, and managing conductive gaps between vehicle collector devices and conductive pathways. The term conductive gap refers to a physical separation of the electrically conductive system components (e.g., the pantograph and the catenary line) such that electrical conductivity is prevented (or significantly reduced). The conductive gaps may be detected relatively early by embodiments of the invention. The gap may be detected before a voltage drop conducted from the conductive pathway to the collector device. Early detection may allow the system to respond so as to reduce or to avoid circuitry damage, ride quality degradation, vehicle shutdown, and other issues associated with an unexpected break in electrical conduction. For example, an unexpected voltage drop caused by encountering a conductive gap can produce arcs, large transients and/or jerk on the vehicle that can damage components and/or degrade ride quality. Similarly, a full voltage sudden reconnect may cause an electrical surge.

Operations of a vehicle through a conductive gap can be managed by the system. For example, the system may keep the vehicle moving through the gap until electrical conduction with the conductive pathway is reestablished beyond the gap. Upon identification of a conductive gap encountered by a vehicle and/or upon prediction of an imminent conductive gap, a system and method according to the embodiments described herein may supplement or supplant voltage available to the vehicle to replace the voltage that is or will be lost upon the vehicle encountering the conductive gap. Optionally, one or more loads consumed by the vehicle may be reduced in anticipation of the voltage drop to reduce the amount of supplementary voltage that is required to maintain vehicle operation through the conductive gap. In addition, the system and method described herein may perform several control operations upon exiting the conductive gap to reduce voltage overshoot associated with the reintroduction of voltage transfer from the conductive pathway to the vehicle collector device.

The system and method may manage the conductive gaps by controlling operations of other vehicles that have not yet encountered a given conductive gap. For example, the system and method identify a location associated with a conductive gap, and then may communicate that location of the conductive gap to one or more other vehicles and instruct the other vehicles to take proactive measures to either accommodate the voltage drop along the conductive gap or avoid the conductive gap. Furthermore, the system and method may manage the conductive gaps by determining a potential cause of a conductive gap and initiating at least one remedial action, based on the potential cause, to alleviate or correct the conductive gaps. For example, the system and method may aggregate gap characteristics, which is statistical data, collected from plural different vehicles and/or plural different trips of a vehicle. The gap characteristics may be collected from an entire fleet of vehicles. The gap characteristics may be analyzed by a controller device to predict the potential cause of a conductive gap and/or generate a recommendation to a facility operator, vehicle operator, and/or dispatch personnel about how to correct the conductive gap. The gap characteristics may be used to determine whether the conductive gap is localized to a specific vehicle, a specific collector device onboard of a vehicle, a specific section of the route, or a specific section of the conductive pathway extending along the route. The at least one remedial action may include directing maintenance, inspection, and/or repair of the vehicle that encountered the conductive gap (e.g., the collector device and/or suspension of the vehicle), the conductive pathway, and/or the route traveled by the vehicle.

At least one technical effect of the system and method described herein may include earlier detection of conductive gaps (e.g., breaks in electrical connection) between the vehicle collector devices and the off-board conductive pathway, which enables quicker responses to avoid or reduce the negative impacts of the gaps. At least one technical effect of the system and method allows the vehicle traveling through a conductive gap to maintain propulsion with limited, if any, degradation or impact in ride quality or movement control (e.g., improving ride quality through conductive gaps). The system and method described herein may provide a reliability improvement by reducing failure modes attributable to arcing electric current. Another technical effect of the embodiments described herein may reduce the number of conductive gaps encountered by vehicles in a vehicle network by warning other vehicles about the locations of identified gaps to avoid the gaps and/or by initiating inspection and repair of specific vehicles, collector devices, route segments, and/or conductive pathway segments to eliminate the identified gaps. At least one technical effect of the embodiments described herein reduces an amount of voltage overshoot upon conductive reconnection of the collection device of the vehicle to the conductive pathway exiting a gap, which enables the use of lower cost power electronics onboard the vehicle and/or reduces the risk of damage to the vehicle power electronics, relative to systems that experience greater voltage overshoots.

While one or more embodiments are described in connection with off-highway vehicles, such as mining trucks, not all embodiments are limited to off-highway vehicles. Unless expressly disclaimed or stated otherwise, the subject matter described herein extends to other types of vehicle systems. Suitable vehicle systems may include rail vehicle systems (e.g., trains), automobiles, highway trucks (with or without trailers), buses, marine vessels, aircraft, agricultural vehicles, tunnel-bound vehicles, construction vehicles, or the like. The vehicle systems described herein may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy, platoon, swarm, etc.).

FIG. 1 illustrates a power transfer system 10 that includes a collector device 12 onboard of a vehicle 14 and a conductive pathway 16. The vehicle travels along a route 18. The conductive pathway extends along the route. The conductive pathway may include one or more electrified cables, wires, rails, bars, or the like conductively connected to an off-board power source. The off-board power source may be an electrical grid, an energy storage device, or the like. In the illustrated embodiment, the conductive pathway is suspended above the route via poles 20. The poles may hold the conductive pathway above the top of the vehicle. The conductive pathway may be a catenary line. In other embodiments, the conductive pathway may be disposed on or close to the ground, or to the side of the vehicle on the route. For example, the conductive pathway may be an electrified rail (e.g., third rail).

The collector device is mounted on the vehicle and is conductively couplable to the conductive pathway. The coupling may be done selectively. The collector device may include one or more electrically conductive contacts, or shoes, that conductively connect to the conductive pathway. A suitable collector device may be a pantograph that supports and extends the contacts or shoes away from the vehicle and towards the conductive pathway. When conductively coupled, an electrical connection is established between the collector device and the conductive pathway, which allows electrical power transfer. The collector device may move with the vehicle relative to the conductive pathway, even when conductively connected to the conductive pathway. The collector device optionally may physically (e.g., mechanically) contact the conductive pathway via the contacts or shoes.

In an embodiment, the vehicle receives electrical power from the conductive pathway, via the collector device, and uses that electrical power to power operations of the vehicle. One of the operations that may be powered by the received electrical power is propulsion. For example, the collector device may be electrically connected to various power electronics and circuitry onboard the vehicle. The electrical power from the collector device may be conveyed to a drive system of the vehicle, an energy storage device on the vehicle, an auxiliary load on the vehicle, a resistive system on the vehicle, a fuel cell on the vehicle, and/or the like. In one mode of operation, electricity that is generated onboard a vehicle may be provided, via the collector device, to off-board circuits.

In the illustrated embodiment, the vehicle encounters a conductive gap in the conductive pathway. As noted above, the conductive gap may refer to a section of the conductive pathway in which there is a complete lack, or at least a significant reduction in the amount, of electrical power conducted between the collector device and the conductive pathway. A significant reduction that represents a conductive gap may be a drop of at least 50% of the amount of current and/or voltage conducted from the conductive pathway to the collector device. For example, a conductive gap may occur if the voltage received by the collector device from the conductive pathway quickly drops from a first amount (e.g., 1700 V) to less than 50% or another threshold percent of that first amount. Depending on the end use application, the significant reduction may be a drop of at least 70%, 75%, 80%, or 90% of the amount of current and/or voltage conducted from the conductive pathway to the collector device. In some embodiments, the conductive gaps may also be referred to as bounces. The conductive gaps occur when the collector device onboard the vehicle loses electrical contact with the conductive pathway, at least temporarily. For example, the conductive gap may last for about 1 second before the conductive connection between the collector device and the conductive pathway is restored and power transfer returns.

In the illustrated embodiment, the conductive gap is caused by physical separation of the collector device from the conductive pathway. For example, one of the wheels 22 or wheelsets of the vehicle enters a depression 24 in the route. The depression may be a rut, a pothole, or the like. The depression may be caused by erosion, degradation of the route, a damage inflicted on the route, and/or the like. In an example, the route may include an unpaved roadbed, and the depression may be caused by degradation in the roadbed. As the vehicle traverses through the depression, the front end of the vehicle lowers relative to the rear end, at least temporarily. The bowing of the frond end pulls the collector device to downward away from the conductive pathway. The collector device may at least temporarily mechanically separate from the conductive pathway. The collector device may reestablish the conductive connection to the conductive pathway upon the wheel or wheelset exiting the depression and/or a spring or other biasing member of the collector device lifting the collector contacts higher to reach the conductive pathway.

If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

FIG. 1 shows the conductive gap as a temporary spatial separation of the collector device from the conductive pathway. Conductive gaps are not limited to instances of spatial separation. A conductive gap may occur whenever electrical conduction between the collector device and conductive pathway is unintentionally disrupted to significantly reduce the power transfer, even if the collector device remains in physical contact with the conductive pathway. Conductive gaps may occur due to sag and/or displacement of the conductive pathway, route degradation, collector device force ineffectiveness, debris and/or contamination on the conductive pathway and/or on the collector device, ineffective suspension response of the vehicle, and/or the like. For example, a conductive gap may result from an ice patch on the conductive pathway and/or the collector device. A conductive gap may result from a debris patch on the conductive pathway and/or the collector device. The debris may include leaves, sand, dirt, grease, and/or the like. A section of the conductive pathway associated with increased electrical resistance and/or reduced conduction of the electric current may also cause a conductive gap. For example, insulation at an intersection between two sections of the conductive pathway may have sufficiently high electrical resistance to cause a conductive gap. A conductive gap may be caused by a deteriorated (e.g., corroded) section of the conductive pathway. For example, the deteriorated section of the conductive pathway may include an oxide layer caused by exposure to the air over time, and the oxide layer may increase the electrical resistance of the conductive pathway. Optionally, one or more contacts of the collector device may be deteriorated, which causes the conductive gap. The vehicle in FIG. 1 is illustrated as a truck. The truck may be an off-highway vehicle that is designed to travel on unpaved roads. For example, the truck may be a mining truck.

Figure 2:
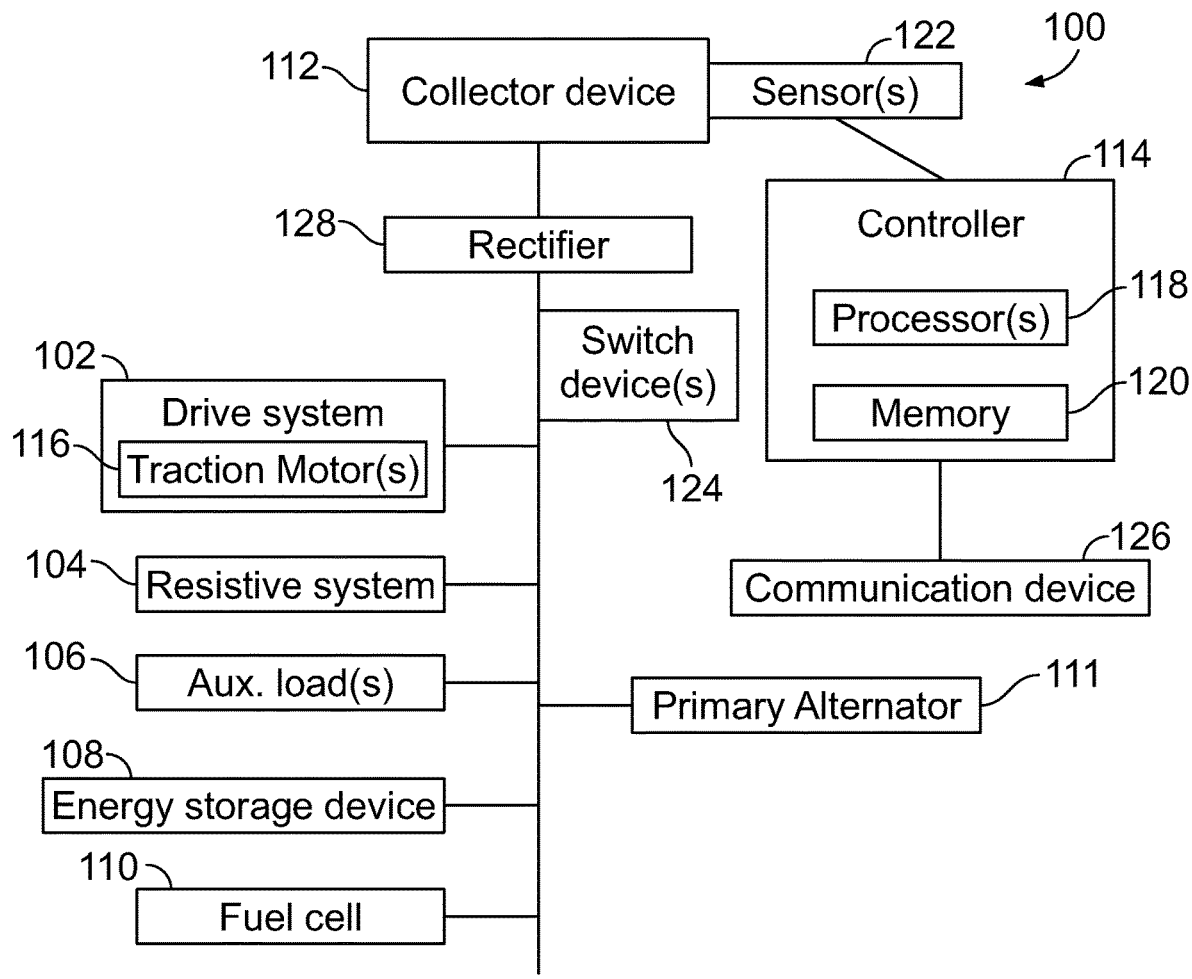
FIG. 2 is a block diagram of a conductive gap management system according to an embodiment.

FIG. 2 is a block diagram of a conductive gap management system 100 according to an embodiment. The conductive gap management system is also referred to herein simply as system. The system may control operations of one or more vehicles that travel on one or more routes. For example, the system may control operations of the vehicle shown in FIG. 1. At least some of the components of the system may be disposed onboard a vehicle, such as the vehicle in FIG. 1. In other embodiments, all of the components of the system are onboard a vehicle.

The system interacts with components of the vehicle, such as a drive system 102, a resistive system 104, one or more auxiliary loads 106, an energy storage device 108, a fuel cell 110, and/or a primary alternator 111 onboard the vehicle. The primary alternator may be connected to a combustion engine and designed to convert mechanical energy to electrical energy for powering one or more loads onboard the vehicle. The drive system includes one or more traction motors 116 that are powered to generate torque for propulsion. For example, the traction motors may generate torque for rotating one or more wheels or axles of the vehicle. The resistive system may include one or more electrically resistive elements for dissipating electrical energy as heat. The auxiliary loads may include an auxiliary alternator, lights, HVAC components, an air compressor, and/or the like. The energy storage device may include one or more battery cells, capacitors, flywheels, or the like designed to store electrical energy. The energy storage device may include a battery pack that contains multiple cells. The components of the vehicle illustrated in FIG. 2 represent some components that may interact with the conductive gap management system. The vehicle may include additional components not shown in FIG. 2.

In an embodiment, the system includes a collector device 112 disposed onboard the vehicle. The collector device is conductively couplable to a conductive pathway extending along a route. The collector device may be the collector device shown in FIG. 1. The system includes a controller 114. The system may include one or more sensors 122, one or more switch devices 124, and/or a communication device 126. The controller is operably connected to the sensor(s), switch device(s), and communication device via wired and/or wireless communication pathways. For example, the controller may send electrical control signals to control the operations of these devices, and may receive information in the form of electrical signals from these devices.

The controller represents hardware circuitry that includes and/or is connected with one or more processors 118 (e.g., one or more microprocessors, integrated circuits, microcontrollers, field programmable gate arrays, etc.). The controller may include and/or is connected with a tangible and non-transitory computer-readable storage medium (e.g., memory) 120. The memory may store programmed instructions (e.g., software) that is executed by the one or more processors to perform operations of the controller described herein. For example, the controller may respond to stimulus, such as sensor data generated by the sensor(s), according to the programmed instructions. The memory may store additional information, such as a database of gap characteristics as described in more detail herein. References herein to one or more processors may refer to the controller, as described herein.

In an embodiment, at least one sensor of the one or more sensors monitors electric current conducted from the conductive pathway to the collector device onboard the vehicle. For example, a current sensor may sense the amount of electric current transferred from the conductive pathway to the collector device over time. The current sensor may generate sensor data indicative of the measured amount of current received by the collector device. The sensor data may be transmitted via the wired or wireless communication pathway to the controller on a periodic basis and/or on demand. The one or more switch devices may be controlled by the controller to direct the received electric current through electronic circuitry to various onboard components. For example, multiple switch devices may be spaced apart and used by the controller to control current flow to and from the drive system, the resistive system, the auxiliary load(s), the energy storage device, the fuel cell, and/or the primary alternator. The switch devices may be solid state, semiconductor switches (IGBTs, MOSFETs, etc.), electromechanical switches (e.g., relays, contactors, etc.), and/or the like.

In an alternative embodiment, one or more processors of the controller may be disposed off-board of the vehicle. The one or more processors may be located remote from the vehicle at a dispatch facility, a data center that houses computer systems (e.g., servers), or the like. When the controller is remote from the power supply system, the sensor data may be remotely transmitted to the controller via the communication device, and the controller may control the onboard components of the vehicle through remote control messages transmitted to the communication device. Optionally, the controller may be distributed such that some components (e.g., processor(s)) of the controller are onboard the vehicle and other components (e.g., processor(s)) of the controller are off-board the vehicle.

In an embodiment, the conductive gap management system provides early detection of conductive gaps encountered by a vehicle traveling on a route. The controller of the system monitors electric current conducted from the conductive pathway to the collector device and/or conducted along the conductive pathway. For example, the controller may receive sensor data from the one or more sensors. The sensor data may be indicative of an amount of electric current conducted along the conductive pathway and/or conducted to the collector device from the conductive pathway.

The controller may detect a drop in the amount of electric current being conducted from the conductive pathway to the collector device based on the sensor data. For example, the controller may rely on the sensor data to sense the drop in the amount of electric current transferred from the conductive pathway to the collector device. The controller may correlate the electric current drop to a conductive gap between the collector device and the conductive pathway. As such, the controller may detect or identify a conductive gap in the conductive pathway based on the drop in the monitored electric current.

Figure 3:
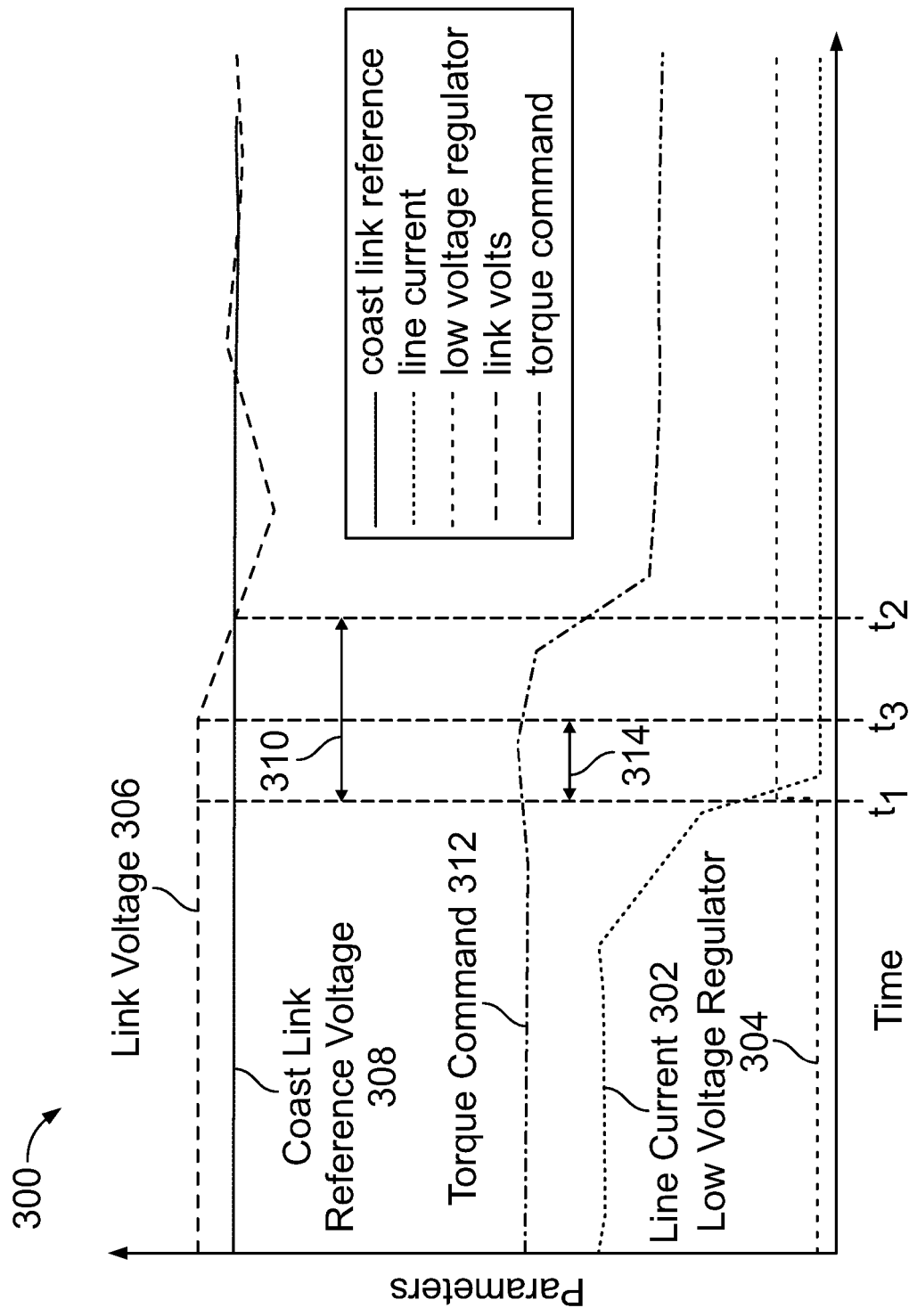
FIG. 3 is a graph depicting various parameters of a vehicle over time while the vehicle travels along a route with an onboard collector device conductively connected to a conductive pathway and encountering a potential conductive gap.

FIG. 3 is a graph 300 depicting various parameters of a vehicle over time while the vehicle travels along a route with an onboard collector device conductively connected to a conductive pathway and encountering a potential conductive gap. The graphed parameters may be associated with the vehicle shown in FIG. 1 and/or the system shown in FIG. 2. One of the parameters is line current 302 that may be transferred to the collector device. Line current refers to the electric current along the conductive pathway. As shown in the graph, the line current is relatively constant at first and then begins to drop. The controller monitors the line current to detect the drop in the amount of the line current. The controller may detect the drop at or around time t1 in FIG. 3. For example, the controller may detect the current drop once the amount of line current falls below a designated threshold value, once the amount of line current drops at least a threshold amount of amps (e.g., threshold deviation) from the value of the line current prior to the drop (while the line current is relatively constant), and/or once the amount of line current falls below a threshold percentage of the value of the line current prior to the drop. Upon detecting the drop at or around time t1, the controller may correlate or associate the detected drop to the vehicle encountering a conductive gap in the conductive pathway.

The controller may respond to the detected conductive gap in the conductive pathway (e.g., the detected drop in the amount of electric current that is transferred) with at least one responsive action. The graph shows that a low voltage regulator device 304 is activated, from an inactive state, at time t1. Activating the low voltage regulator may represent an example responsive action. For example, upon detecting the drop in line current, the controller may initiate a voltage regulation mode to maintain a designated line voltage (e.g., voltage along the conductive pathway) as the vehicle travels through the conductive gap. The voltage regulation mode may involve controlling an onboard energy source to supply electrical power to achieve and maintain the designated line voltage. In the voltage regulation mode, the controller may control at least one of the traction motors (e.g., motor(s) 116 in FIG. 2) that propels the vehicle to generate electric current via regenerative braking. In another example, the controller may control one or more switch devices (e.g., switch devices 124 in FIG. 2) to close a circuit to provide electric current from an energy source disposed onboard the vehicle. The energy source may be a battery, a capacitor, and/or a fuel cell. For example, the energy source may be the energy storage device 108 and/or the fuel cell 110 in FIG. 2. In still another example, the controller in the voltage regulation mode may control an auxiliary load of the vehicle to generate supplemental electric current. The supplemental current generated by traction motors, onboard energy source, and/or auxiliary loads may be used to compensate (e.g., balance) the reduced line current received from the conductive pathway. The supplemental current may be used to hold a specific link voltage 306 onboard the vehicle during the conductive gap. The link voltage may refer to the voltage of a direct current (DC) bus onboard the vehicle. Optionally, the controller may combine the electric current received from at least two of the example sources of supplemental current described above. For example, the controller may concurrently control the traction motors to provide regenerative braking and direct current from the energy storage device. The low voltage regulator in FIG. 3 may refer to the operation of any of the devices that are controlled to supply electrical power during the voltage regulation mode, such as activation of the regenerative mode of the traction motors or the like.

The controller may quickly initiate the responsive action(s) to reduce the severity of the impact of the conductive gap, relative to initiating the responsive action at a subsequent time. The controller may initiate the responsive action prior to, or during, a subsequent drop in voltage being conducted from the conductive pathway to the collector device. For example, as shown in FIG. 3, the drop in line current 302 may occur prior to a decrease or drop in the link voltage 306 when a conductive gap is encountered by a vehicle traveling along a route. FIG. 3 shows that the link voltage crosses below a coast link reference voltage 308 at time t2, which is subsequent to time t1 by a delay period 310. The coast link reference voltage is used as a threshold. The coast link reference voltage may track the line voltage of the conductive pathway. The delay period may be on the order of milliseconds. Still, monitoring the line current to detect the conductive gap enables initiating responsive action(s) at time t1, earlier than if the link voltage crossing the coast link reference voltage at time t2 were used to detect the conductive gap. For example, monitoring the line current may allow for earlier entry into the voltage regulation mode than if the controller relied on a voltage drop to detect the conductive gap. FIG. 3 also depicts the torque command 312 of a drive system over time. The torque command decreases after detecting the conductive gap and after taking responsive action, such as activating the low voltage regulator to supply electric current to the DC link/bus in the voltage regulation mode.

In one embodiment, a combination of the line current and the link voltage may be used to detect the conductive gap. For example, the conductive gap detection may be based on a value of the line current, a change (e.g., drop) in the line current over time, a value of the link voltage, and/or a change (e.g., drop) in the link voltage over time. Referring to multiple parameters may be used to confirm with confidence the presence of a disconnection and gap. For example, an inflection in the link voltage occurs in FIG. 3 at time t3. Time t3 is after time t1 and precedes time t2. The controller may detect the inflection point in the link voltage at time t3 to determine or confirm the conductive gap. The voltage inflection is delayed by a period 314 relative to the time at which the current drop is detected at time t1, but still provides advance notice of the conductive gap before the link voltage crosses the coast link reference voltage at time t2. Optionally, the system may be designed to determine that a conductive gap is present only when both the current and another monitored parameter, such as voltage or change in voltage over time, indicate the conductive gap. Alternatively, the system may determine the presence of a conductive gap when any of the monitored parameters indicate the conductive gap.

After entering the voltage regulation mode while still encountering the conductive gap, the controller may attempt to hold the link voltage at a value of the coast link reference voltage. The coast link reference voltage may be at or close to the line voltage of the conductive pathway to reduce the extent of voltage overshoot when reconnection occurs upon exiting the conductive gap. Transitively, the controller may attempt to maintain the link voltage of the vehicle at a value of the line voltage of the conductive pathway during the conductive gap to limit voltage overshoot. The controller may estimate the line voltage by adding the value of the line voltage immediately before encountering the conductive gap (e.g., while the collector device was still receiving electric current from the conductive pathway) to an expected voltage increase attributable to load reduction. The expected voltage increase due to load reduction may be determined by the controller aggregating the loads onboard the vehicle that were being powered by the electric current received from the conductive pathway.

Within the voltage regulation mode and as a responsive action to detecting the conductive gap, the controller may proportionally supplement the voltage available to the vehicle. For example, as the voltage received from the conductive pathway decreases during the conductive gap (referred to herein as pathway voltage), the controller increases the amount of supplement voltage that is supplied by one or more onboard energy sources (e.g., the traction motors, energy storage devices, fuel cells, auxiliary loads, etc.), at an about proportional level so that an observed voltage by the vehicle stays about constant. The supplement voltage supplants the loss of pathway voltage. The controller may use the supplement voltage to power the drive system to continue propelling the vehicle through the conductive gap and/or to continue powering vehicle loads (e.g., HVAC, lights, computers, sensors, air compressors, etc.), particularly safety-critical loads. The observed voltage refers to the voltage that is present on the DC link of the vehicle for use by the vehicle to generate tractive effort and power onboard components. The controller may attempt to provide sufficient supplement voltage for the observed voltage during the conductive gap to remain within a designated margin of the actual observed voltage just prior to the gap and/or an expected observed voltage just after exiting the gap upon reconnection to the conductive pathway. The margin may be +/−10%, +/−15%, or the like. The margin may be based on vehicle-specific component capabilities. The margin may avoid hysteresis.

The controller may achieve maintaining the link voltage on the vehicle at about the coast link reference value and/or the line voltage of the conductive pathway by reducing one or more loads of the vehicle (e.g., an auxiliary load), controlling an auxiliary load to generate supplement electric current, supplying electric current from the energy storage device (e.g., battery pack) onboard the vehicle, and/or controlling one or more of the traction motors to generate electric current via regenerative (e.g., dynamic) braking. Supplying supplement electric current from the auxiliary load, energy storage device, and/or traction motors to the link or DC link/bus may increase the link voltage relative to the coast link reference value. Reducing the one or more loads, such as auxiliary loads, of the vehicle may reduce the link voltage. The controller may selectively vary the supply of supplement voltage and the reduction of auxiliary loads over time in order to hold the link voltage at the designated reference value.

As described above, the controller may respond to a detected drop in the amount of electric current being conducted from the conductive pathway to the collector device by initiating one or more responsive actions. One potential responsive action includes supplanting pathway voltage, which is voltage previously conducted from the conductive pathway to the drive system of the vehicle prior to encountering the conductive gap, with regenerated voltage that is generated by one or more components of the vehicle. The regenerated voltage may be generated by the one or more traction motors, an auxiliary load (e.g., a non-traction motor, a generator, or the like), an auxiliary combustion engine, and/or the like. Another potential responsive action includes reducing one or more loads of the vehicle, which has the effect of reducing voltage overshoot upon reconnection in which the pathway voltage is again conducted to the vehicle. The controller may reduce one or more loads by deactivating one or more active components that draw electrical power and/or reducing the operation level of one or more active components. For example, the controller may temporarily suspend operation of an HVAC system or an air compressor of a brake system for the brief period in which the vehicle encounters the conductive gap. Another potential responsive action may be to supplant the pathway voltage with battery voltage stored in the energy storage device onboard the vehicle. For example, the battery voltage may be supplied by one or more battery cells or capacitor banks of the energy storage device. The controller may supplant the pathway voltage with fuel cell voltage generated by the fuel cell(s) onboard the vehicle as another potential responsive action. The controller optionally may initiate more than one of the responsive actions.

Figure 4:
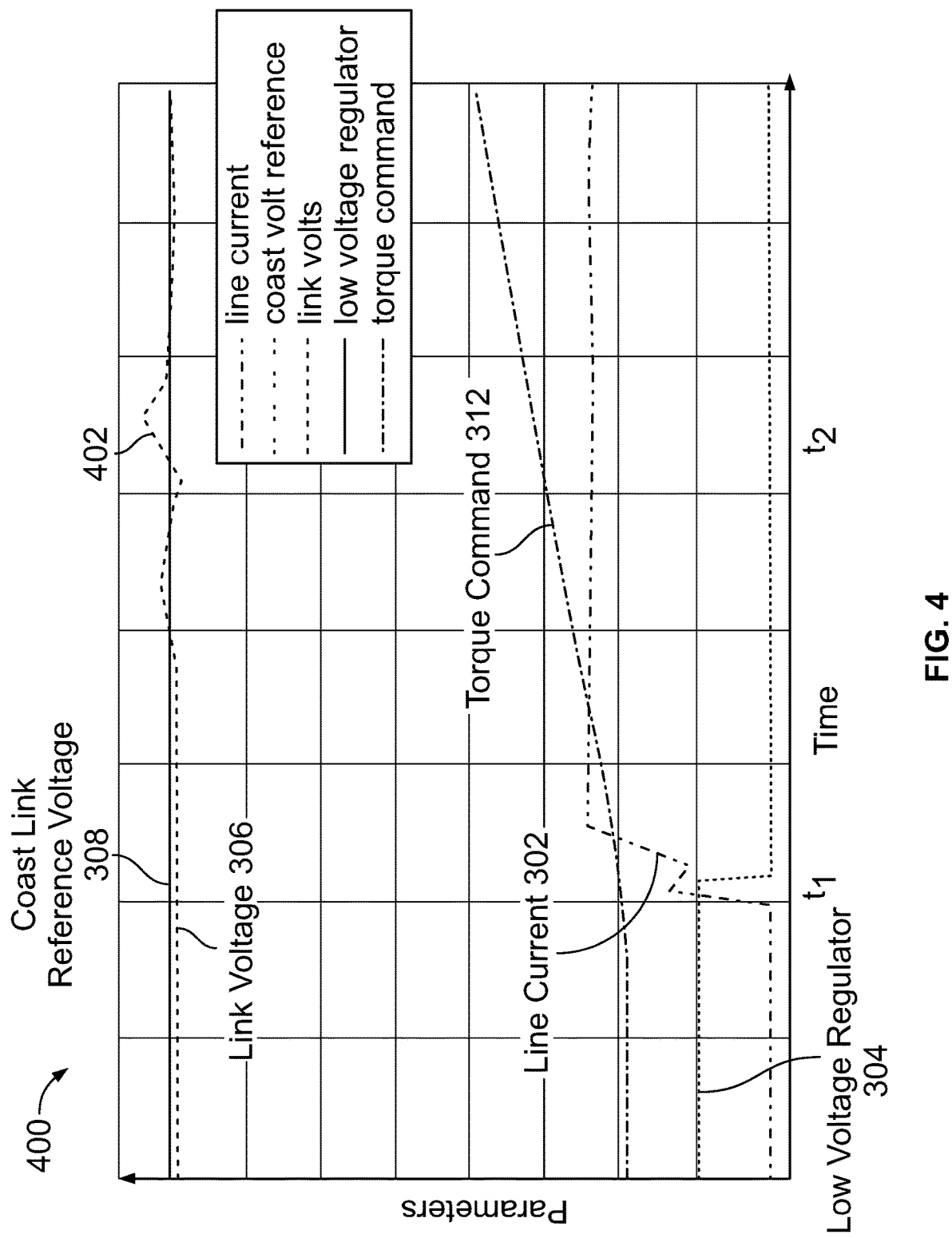
FIG. 4 is a graph depicting various parameters of a vehicle over time while the vehicle travels along a route with an onboard collector device conductively connected to a conductive pathway.

FIG. 4 is a graph 400 depicting various parameters of a vehicle over time while the vehicle travels along a route with an onboard collector device conductively connected to a conductive pathway. The graphed parameters may be associated with the vehicle shown in FIG. 1 and/or the system shown in FIG. 2. The parameters in FIG. 4 match the parameters depicted in FIG. 3. The graph of FIG. 3 represents the vehicle entering a conductive gap, and the graph of FIG. 4 represents the vehicle exiting the conductive gap.

The controller may continue to monitor the line current during the conductive gap. The line current is initially low (e.g., possibly zero) in FIG. 4 because of the conductive gap. At or about time t1 in FIG. 4, the controller may detect a rise in the line current which is indicative of reestablished current conduction from the conductive pathway to the collector device of the vehicle. The controller may respond by deactivating or exiting the low voltage regulator 304. FIG. 4 shows that the level of the low voltage regulator drops soon after the rise in the line current. Deactivating the low voltage regulator may correspond to exiting the voltage regulation mode, which uses onboard components to provide supplement voltage to the DC link to supplant the lost pathway voltage. Deactivating the low voltage regulator based on the sensed rise in line current may enable earlier deactivation of the low voltage regulator (e.g., earlier exiting of the voltage regulation mode) than if voltage was used as the trigger to determine the end of the conductive gap, which may result in a smaller voltage overshoot to the link voltage. The voltage overshoot 403 occurs at time t2 in FIG. 4, and refers to the amount by which the link voltage temporarily exceeds the coast link reference voltage 308 upon exiting the conductive gap.

The controller may take one or more responsive actions upon exiting the conductive gap to reduce the link voltage overshoot. The responsive actions may be initiated immediately after exiting the voltage regulation mode (at about time t1) in order to affect the voltage overshoot that occurs at about time t2. The responsive actions may include increasing the traction load of one or more motors that propel the vehicle, increasing an auxiliary load of the vehicle, closing a circuit to provide electric current to the energy storage device for energy storage, and/or closing a circuit to provide electric current to the resistive system onboard the vehicle. As shown in FIG. 4, the torque command 312 gradually increases after time t1, which increases the traction load. The resistive system may be a dissipation mechanism with a grid of resistors (e.g., resistive elements) that dissipate electrical energy as heat. The voltage overshoot may be reduced by using excess link voltage to power the increased traction and/or auxiliary loads, by storing excess link voltage in the energy storage device, and/or by dissipating excess link voltage using the resistive system. These responsive actions may change a load-variable electrical resistance of one or more loads of the vehicle prior to the vehicle fully exiting the conductive gap (e.g., at or after time t2). The controller may change the load-variable electrical resistance of the load(s) prior to the vehicle exiting the conductive gap in order to control a rate of change in the electric current received from the conductive pathway upon the vehicle exiting the conductive gap.

The conductive gap management system may include a rectifier 128 (shown in FIG. 2) onboard the vehicle. The rectifier may be disposed between the collector device and the drive system of the vehicle (including the traction motors). For example, the rectifier may be electrically connected between the collector device and the DC link bus of the vehicle that supplies electric current to the drive system and other vehicle loads. The controller may use the rectifier as another example to change the load-variable electrical resistance of the load(s) prior to the vehicle exiting the conductive gap. For example, the controller may disconnect the rectifier until the voltage overshoot is no more than a designated voltage threshold. The rectifier may be a series power electronic component, with gate-fired power electronic hardware. In an embodiment, the rectifier is a silicon-controlled rectifier (SCR).

The rectifier may be designed to switch to an off, non-conducting state in response to the current drop of a conductive drop. Once line current rises, indicating that the conductive gap has ended, the rectifier may be designed to remain in the non-conducting state until one or more conditions for reestablishment are satisfied. One example condition is that the voltage overshoot is no more than a designated voltage threshold. For example, the voltage overshoot may be the difference (e.g., delta) between the line voltage and capacitive link voltage. Upon meeting the one or more conditions, the rectifier switches to an on, conducting state to enable current conduction from the collector device to the DC link bus. The voltage threshold value and other conditions are selected based on the component hardware to assure a reasonable inrush upon connection and load reestablishment, preventing significant voltage overshoot or transient from the conductive gap.

In an example use case, once the reconnection occurs upon exiting the conductive gap, the line voltage from the conductive pathway is measured, and the rectifier remains in the non-conducting state. The controller takes responsive action(s) to control the link voltage to match the line voltage. Once the conditions are met, the rectifier may switch to the conducting state (either by command of the controller or automatically based on experienced parameters). Once the rectifier switches to the conducting state, the vehicle can receive the electric current from the conductive pathway and use the current to power operation of the vehicle with little or no transient on the link voltage of the vehicle. In an alternative embodiment, the vehicle lacks the rectifier shown in FIG. 2. The vehicle may include a different type of electronic component in place of the rectifier, or may have no electronic component in the circuit between the collector device and the drive system.

In an embodiment, the controller may change the load-variable resistance, to control the rate of change in the electric current received from the conductive pathway, by a difference between the electric current conducted along the conductive pathway (e.g., the line current) and a load current demanded by the load(s) of the vehicle (e.g., a link current). For example, some voltage overshoot can occur from small mismatch in the voltage present at reconnection. The controller may monitor the difference between the line current from the conductive pathway and the load or link current over time. The controller may use that delta or difference to determine whether additional load current transiently to prevent voltage overshoot.

In a first example, voltage overshoot may be reduced or eliminated by adding load to cause the load current to approximately match the line current from the conductive pathway during the overshoot period. The controller may determine the amount of load to add based on the difference between the line current and the load current. In a second example, the controller may increase the torque commanded, instead of or in addition to increasing the load, to cause the load current to match the line current. The additional load may be applied by feed forward into torque control at max torque apply rate. In another example, the controller may increase the load applied by full loading of an auxiliary load circuit. The overshoot may be reduced or eliminated by the controller adding load directly with a DC-DC converter to force power transfer to a secondary link or other auxiliary systems with power absorption capability. The power transfer may keep the line current and load current about equal during the overshoot period. The controller may control the amount of power transfer based on the difference between the line current and the load current. In another example, the controller may increase the load applied by transferring power to the energy storage device to store to charge the energy storage device. The DC-DC converter may be used to force power transfer to the energy storage device. This control strategy may allow the transition of battery power back to line power.

In an embodiment, after detecting a conductive gap along the conductive pathway, the controller of the conductive gap management may communicate with one or more other vehicles and/or an off-board vehicle network controller to notify the receiver about the detected conductive gap. Notifying other vehicles, either directly or indirectly through one or more intervening devices, can allow the other vehicles to take proactive measures prior to encountering the conductive gap, which may reduce the impact of the gap on the other vehicles.

In an embodiment, the controller that detected a conductive gap may determine a location of the conductive gap that was encountered by a first vehicle. The location may refer to the location of the gap along the conductive pathway and/or the route. The location may be determined based on a location determining sensor of the one or more sensors onboard the vehicle (e.g., the sensors 122 in FIG. 2). The location determining sensor can include a receiver, at least one antenna, and associated circuitry. A suitable location determining sensor may be a GNSS receiver (e.g., a global positioning system (GPS) receiver) that generates data indicative of a location (e.g., a three-dimensional positional coordinate) for the vehicle within a global coordinate system based on signals received from satellites. In an alternative embodiment, the location determining sensor can determine the respective location based on other mechanisms, such as using signals received from wayside devices, by tracking the direction and distance traveled from a checkpoint location that has determined or assigned coordinates, from a dead reckoning system, or the like. The controller may store the location of the conductive gap within the memory of the controller.

After determining the location of the conductive gap, the controller may notify at least a second vehicle and/or may control operation of at least the second vehicle based on the location of the conductive gap. For example, the controller may notify the second vehicle of the location of the conductive gap prior to the second vehicle reaching the location of the conductive gap. The controller may notify the second vehicle by communicating a notification message to the second vehicle via the communication device onboard the vehicle. Alternatively, the controller may communicate the notification message to the off-board vehicle network controller. The off-board vehicle network controller may be a device located at a data center, a dispatch facility, or the like. The off-board vehicle network controller may determine which vehicle or vehicles are scheduled to traverse the location of the conductive gap, and may communicate notifications to those affected vehicle(s). The notification messages may be communicated such that the second vehicle receives the notification prior to reaching the location of the conductive gap. In response to receiving the notification, the second vehicle may alter a scheduled route to avoid the conductive gap or may take one or more proactive actions prior to reaching the conductive gap to reduce the impact of the gap on the second vehicle.

Optionally, the controller may control or command specific operations of the second vehicle based on the determined location of the conductive gap. For example, the controller may generate and communicate control signals for remotely controlling the movement of the second vehicle. Upon receipt of the control signals, the second vehicle may be in a configuration to automatically implement the control signals. Alternatively, the controller may command or instruct specific operations, and a controller or human operator of the second vehicle may have the ability to deny the instructed operations. For example, instructions may be displayed to a human operator on a display device, and the operator can select whether or not to implement the instructed operations.

The operations that are generated by the controller and sent to the second vehicle may involve modifying a position of the collector device, changing movement properties or performance of the second vehicle, and/or changing a source of power utilized by the second vehicle for propulsion. In one example, the controller may control or command that one or more motors of the second vehicle use an onboard source of power of the second vehicle while conditioning the conductive pathway with the collector device during travel of the second vehicle through the location of the conductive gap. For example, prior to reaching the location of the conductive gap, the second vehicle may be controlled or commanded to switch from using the conductive pathway as the propulsion power source, to using an onboard power source. The onboard power source may be the primary alternator that is powered by a combustion engine, one or more traction motors operating in regenerative braking mode, the energy storage device, a fuel cell, an auxiliary load operating to generate electrical power, and/or the like. By switching to the onboard source of power prior to reaching the location of the conductive gap, the drop in line current along the conductive gap may have little if any effect on the movement of the vehicle. In preparation of the upcoming conductive gap, the controller may not only control or command switching to the onboard power source, but may also control or command increasing the onboard voltage supplied by the onboard power source during travel of the second vehicle through the location of the conductive gap. The voltage of the onboard power source may be increased to a level that is at or closer to the line voltage of the conductive pathway (outside of the conductive gap). Increasing the voltage supplied by the onboard power source may reduce or eliminate a drop in the observed voltage of the vehicle upon entering the gap.

The second vehicle may be controlled or commanded to maintain the collector device in an extended or lifted position, via one or more actuators, such that the collector device maintains contact with the conductive pathway as the second vehicle travels through the location of the conductive gap, even though the electrical connection is broken or impeded. The collector device in the extended position may condition (e.g., clean or clear) the conductive pathway by providing mechanical interference that may remove ice patches, debris patches, and/or other contaminants from the conductive pathway. Alternatively, the controller may control or command that the collector device be separated from the conductive pathway during travel of the second vehicle through the location of the conductive gap. For example, the controller may control the actuator(s) to retract or lower the collector device to spatially separate the collector device from the conductive pathway as the vehicle traverses the conductive gap. Retracting the collector device prior to or immediately upon entering the conductive gap may reduce wear and the risk of damage to the rubbing components, and may also reduce friction on the vehicle.

In another example, the controller may control or command that the second vehicle change movement properties prior to, or upon, reaching the location of the conductive gap. For example, to reduce the load on the onboard power source that is selected to power the second vehicle through the conductive gap, the controller may control or command that the second vehicle reduce performance (e.g., tractive effort and output). The controller may control or command that the second vehicle reduce the moving speed of the second vehicle and/or reduce a torque output by the one or more motors of the second vehicle, prior to the second vehicle reaching the location of the conductive gap. Reducing the performance may reduce the load on the onboard power source through the gap.

In another example, the controller may control or command that the second vehicle laterally move relative to the route and the conductive pathway prior to the second vehicle reaching the location of the conductive gap. For example, the controller may determine that the conductive gap is attributable to route degradation at a first lateral position at the determined location. The controller may control or command that the second vehicle laterally move to a second lateral position that avoids the first lateral position, and therefore avoids the conductive gap. In yet another example, the controller may control or command that the second vehicle regulate a link voltage of the second vehicle during travel of the second vehicle through the location of the conductive gap. The second vehicle may regulate the link voltage by controlling the loads and the supplement voltage supplied by onboard power sources such that the link voltage of the DC link is maintained within a designated margin of a determined voltage value. The controller optionally may control or command the second vehicle to adopt more than one of these listed examples.

In an embodiment, the controller controls or commands the second vehicle to use the primary alternator as the onboard power source that powers propulsion of the second vehicle through the conductive gap. The controller may control or command the second vehicle to increase the alternator voltage temporarily for traversing the gap. As the gap is encountered, the torque command may be reduced to about 50% of the previous command before entering the gap. The link voltage may be approximately the same as the alternator voltage during the gap. The engine supplies a load to hold the DC link voltage. The torque may remain positive once the link voltage matches the alternator voltage. Upon reconnection at the end of the gap, the voltage overshoot may be reduced to an acceptable range above the line voltage in the conductive pathway. For example, the voltage overshoot may be about 100 V above the line voltage. The vehicle may remain in the propulsion mode as the line current returns.

In an alternative control strategy that uses the primary alternator of the second vehicle as the onboard power source, the controller may control or command that a traction load is removed in response to the drop in line current upon encountering the gap. The alternator then begins supplying electrical power to increase the link voltage until the link voltage approximately matches the value of the line voltage, as monitored prior to the gap. Upon reconnection exiting the gap, the disturbance to the link voltage of the second vehicle may be relatively small while the traction load is reapplied.

In an embodiment, the conductive gap management system may aggregate information about detected conductive gaps to provide maintenance that removes the conductive gaps. Eliminating conductive gaps improves the performance of vehicles along the routes by avoiding temporary breaks in conduction between the conductive pathway and the collector devices of the vehicles. Each time the controller detects a conductive gap, the controller may record details about the conductive gap. The controller may detect multiple gaps encountered by the same vehicle at different locations along a trip of the vehicle. The controller may also detect multiple gaps encountered by the vehicle at various locations along other trips of the vehicle. The controller may store the details in the memory of the controller or another storage device. The controller may communicate the records remotely to another vehicle or off-board control device. In an embodiment, the controller of the conductive gap management system may detect conductive gaps encountered by plural different vehicles at various different times. For example, the controller may obtain trip records generated by plural different vehicles.

The controller may analyze the historical records of the conductive gaps to identify a potential cause of one or more of the conductive gaps based on the analysis. The controller may analyze the records to determine one or more gap characteristics for each of the detected conductive gaps. The gap characteristics may include locations along the route and/or the conductive pathway at which the conductive gaps are detected (e.g., via drops in the amount of electric current conducted from the conductive pathway). The gap characteristics may include lateral positions along a width of the route at which the collector device is located while the conductive gaps are detected. For example, the collector device and/or the conductive pathway may be sufficiently wide to enable the vehicles to travel along the route at different lateral positions. The lateral positions may partially-overlap, such that a first vehicle at a first lateral position may not be able to pass by a second vehicle in a second lateral position that is adjacent to the first lateral position. Optionally, the first vehicle in the first lateral position may be able to pass a third vehicle in a sixth lateral position due to sufficient spacing between the first and sixth lateral positions.

The gap characteristics may include an extension position of the collector device from the vehicle at the conductive gaps are detected. For example, the extension position may refer to the position of the collector device at the time that the drop in line current is detected. The position may be characterized as extended or retracted, or may include a specific extension setting or distance (e.g., extended setting 4 of a maximum setting 6, extended 3 feet, etc.). The gap characteristics may include times of day at which the conductive gaps are encountered. The gaps characteristics may include identifications of the vehicles that encountered the conductive gaps. The vehicle identifications may be unique identifiers, such as registration numbers, VINs, and the like. The identifications may include information about the vehicle type and model, the owner, the operator in control of movement of the vehicle when the conductive gap was detected, and/or the like.

The gap characteristics may include headings of the vehicles that encountered the conductive gaps and/or movement directions of the vehicles. The gap characteristics may include weather conditions where the vehicles encountered the conductive gaps. The weather conditions may include temperature, precipitation, and the like. The gap characteristics may include rotational speeds of one or more wheels of the vehicles that encountered the conductive gaps and/or movement speeds of the vehicles that encountered the conductive gaps.

The gap characteristics may include tractive powers output by one or more motors of the vehicles that encountered the conductive gaps. The gap characteristics may include torque profiles of the one or more motors of the vehicles that encountered the gaps. The gap characteristics may include one or more distances traveled by the vehicles that encountered the conductive gaps while the one or more motors of the vehicles were powered by the electric current from the conductive pathway.

The gap characteristics may include suspension pressures within a suspension system of the vehicles that encountered the conductive gaps. The suspension pressure may be measured by a pressure sensor integrated into the suspension system of the vehicle. As a vehicle drives over a depression, such as a pothole, the vehicle may drop into the depression causing a sharp, temporary increase in the suspension pressure as the vehicle bottoms out and exits the depression. A profile showing the suspension pressure over time (or based on distance along the route) may include short, sharp pressure increases which could be indicative of depressed route segments that cause a conductive gap between the vehicle collector device and the conductive pathway. The suspension pressure profile could be used to detect a possible conductive gap or to confirm a previously-detected conductive gap by providing a second source that indicates a time, distance, and/or location at which the conductive gap likely occurred.

Another gap characteristic may be one or more tilt profiles of the vehicle over time. The tilt of the vehicle may include yaw, pitch, and/or roll of the vehicle. The tilt may be measured by an accelerometer, an IMU (inertial measurement unit). or another sensor that detects tilt or a change in tilt of the vehicle. As a vehicle drives over a depression along the route that aligns with only a first set of wheels of the vehicle, the vehicle may tilt as the first set of the wheels enters the depression while the second set of wheels, on the other side of the vehicle, remain out of the depression. A tilt profile over time (or distance along the route) can indicate when the vehicle traverses such depressed route segments, which could result in a conductive gap. The tilt profiles could be used to detect a possible conductive gap or to confirm a previously-detected conductive gap.

The controller may compile the gap characteristics by grouping the recorded conductive gaps based on common or shared characteristics. The controller may use the gap characteristics to identify the potential cause of one or more of the detected conductive gaps. The potential causes may be useful for efficient remediation of the conductive gaps. By compiling the gap characteristics, a potential cause may be identified for the conductive gaps that share certain characteristics, such as gaps that are associated with a common location along the route, gaps that are associated with a common vehicle of the plural vehicles that are tracked, and/or gaps that are associated with a common operator of plural different operators onboard the vehicles. Based on trends in the data, the controller may identify different potential causes of different conductive gaps.

The controller may identify the potential cause of a first conductive gap as degradation of a roadbed of the route. For example, if the data indicates that multiple different vehicles repeatably experienced a conductive gap at about the same location along the route and the conductive pathway at different times, then the gaps may be attributable to route degradation. The route degradation may form a low spot, which causes the collector devices to briefly separate from the conductive pathway upon traversing the low spot. However, similar experiences could also be explained by displacement of the conductive pathway rather than route degradation. The controller may utilize image data generated by cameras to distinguish between a sagging and/or displaced catenary line and a degraded route. Optionally, the controller may identify both displacement of the conductive pathway and route degradation as potential causes for the first conductive gap.

In another example, the lateral positions of the vehicles may be used by the controller to identify a potential cause of one or more conductive gaps. A gap may be detected at a particular location along the route by vehicles that travel within a first set of the lateral positions, such as positions 1 through 3, significantly more often than vehicles that travel through the same location within a second set of the lateral positions, such as positions 4 through 6. If the conductive pathway is unaffected by lateral position, then the controller may determine that there is route degradation along the first set of lateral positions.

The controller may identify the potential cause of a second conductive gap as failure of the collector device of one or more of the vehicles to exert at least a threshold force on the conductive pathway. For example, if the data indicates that a first vehicle experienced more total conductive gaps along a given route during multiple different trips over different days than other vehicles on the same route for the same total number of trips, then the controller may identify the potential cause as related to the first vehicle. If the first vehicle is controlled by different operators and still experiences more conductive gaps, then the controller may determine the potential cause as specific to the first vehicle. The potential cause may be that the collector device of the first vehicle fails to exert at least the threshold force on the conductive pathway. Another potential cause may be the that vehicle suspension of the first vehicle is degraded and unable to exert at least a threshold force on the collector device to maintain connection to the conductive pathway.

The controller may identify the potential cause of a third conductive gap as contamination on the conductive pathway. The contamination may include any debris that can accumulate such as snow, ice, leaves, copper dust, carbon, dirt, and/or the like. For example, the data may indicate that several vehicles traveling on a segment of the route experienced conductive gaps during a first time period (e.g., within 24 hours), and then experienced significantly fewer gaps along the same route segment during a second time period (e.g., the next 24 hours). The controller may identify a potential cause of the conductive gaps as contamination on the conductive pathway. The controller may confirm the potential cause as contamination if weather reports and/or measured conditions indicate freezing weather and/or precipitation during the first time period but not during the second time period.

After identifying the potential cause of one or more of the detected conductive gaps based on the gap characteristics, the controller may initiate at least one remedial action to address the conductive gaps based on the identified potential cause. The remedial action may include automatically controlling operation of an approaching vehicle that is traveling toward at least one of the locations of the conductive gaps that are identified to avoid a reduction in pathway voltage that is conducted from the conductive pathway to one or more motors of the approaching vehicle. The remedial action may include notifying an operator of the approaching vehicle that is traveling toward the at least one of the locations of the conductive gaps. The remedial action may include directing maintenance, inspection, or repair of the conductive pathway at the at least one of the locations of the conductive gaps. In another example, the remedial action may involve directing maintenance, inspection, or repair of the collector device of one or more of the vehicles that encountered the conductive gaps. The remedial action may include directing maintenance, inspection, or repair of a vehicle suspension of one or more of the vehicles that encountered the conductive gaps. In yet another example, the remedial action may include directing maintenance, inspection, or repair of a roadbed of the route at the at least one of the locations of the conductive gaps.

Figure 5:
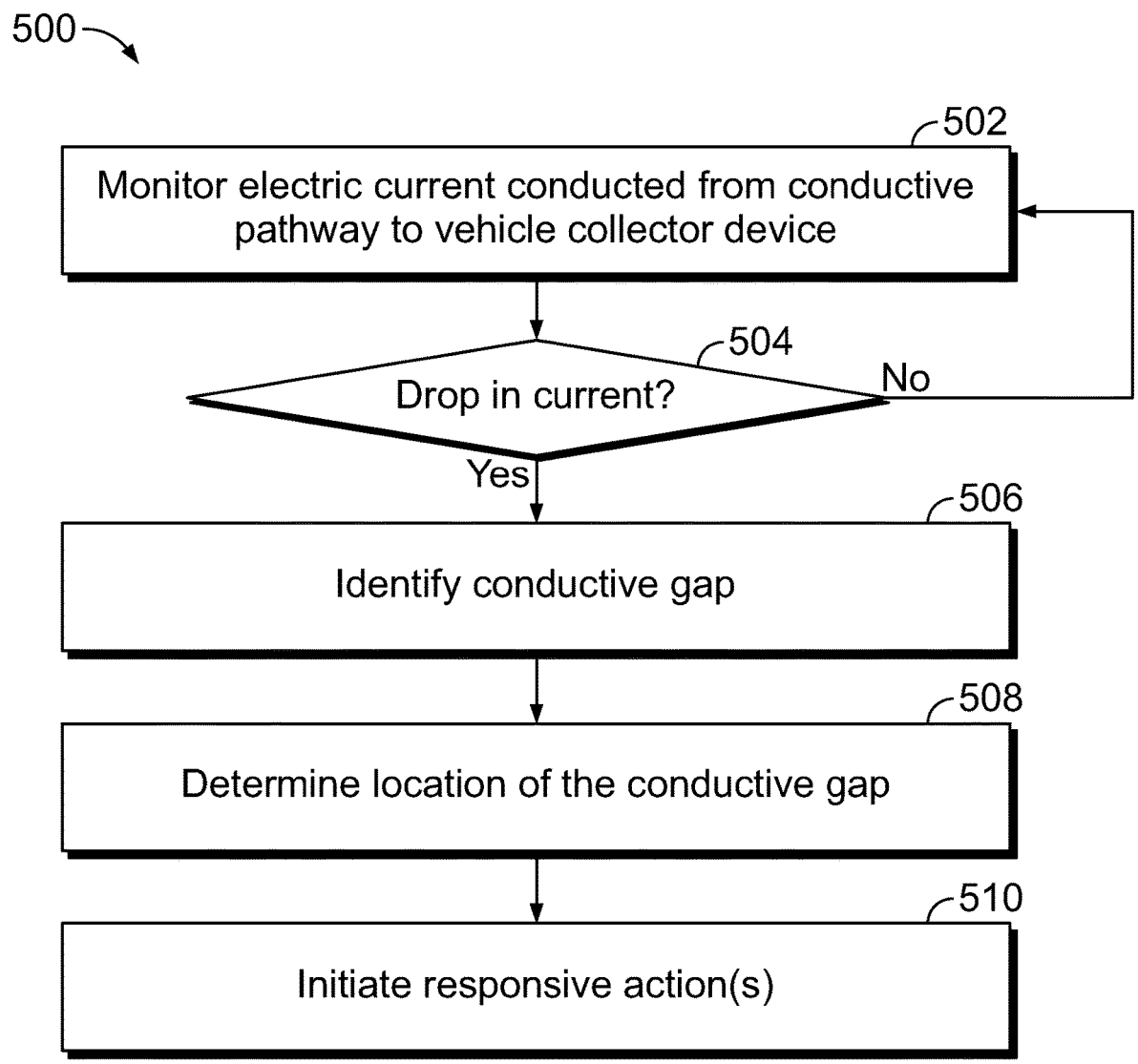
FIG. 5 is a flow chart of a method for detecting and managing conductive gaps between a collector device of a vehicle and a conductive pathway according to an embodiment.

FIG. 5 is a flow chart of a method 500 for detecting and managing conductive gaps between a collector device of a vehicle and a conductive pathway according to an embodiment. The steps of the method may be performed by the controller of the conductive gap management system shown in FIG. 2 (e.g., the one or more processors thereof). The method may include additional steps not shown in FIG. 5, may omit one or more of the steps shown in FIG. 5, and/or may be performed in a different order than shown in FIG. 5.

At step 502, electric current conducted from the conductive pathway to the vehicle collector device is monitored. At step 504, a determination is made whether there is a drop in an amount of electric current conducted from the conductive pathway to the vehicle collector device. For example, a decrease in the amount of current may have to exceed at least a threshold absolute or relative value (relative to the current prior to the drop) to be classified as a drop. If the drop is not detected, then flow returns to step 502.

If the drop in the amount of electric current is detected, then flow proceeds to step 506. At step 506, a conductive gap in the conductive pathway is identified. The identification may include generating a record of the detection of the gap. At step 508, a location of the conductive gap may be determined. The location may refer to a location along a length of the route. The location may also refer to a lateral position of the vehicle that experienced the gap, relative to the conductive pathway. At step 510, at least one responsive action is initiated. The responsive action(s) that are initiated are selected to reduce the negative impact of the conductive gap on the vehicle that encounters the gap. The responsive action(s) may enable the vehicle to provide continued propulsion during the gap, even without the electric current from the conductive pathway, to limit the effect of the gap on the movement of the vehicle.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to minor the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

In at least one embodiment, a method is provided that involves a conductive pathway extending along a route traveled by a vehicle and a collector device onboard the vehicle and conductively couplable to the conductive pathway. The method may include responding to a detected drop in an amount of electric current being conducted from the conductive pathway to the collector device with a responsive action prior to or during a subsequent drop in voltage being conducted from the conductive pathway to the collector device. Optionally, the responsive action includes one or more of: (i) generating electric current from at least one motor that propels the vehicle; (ii) closing a circuit to provide electric current from an energy source disposed onboard of the vehicle; (iii) reducing an auxiliary load of the vehicle; or (iv) generating supplemental electric current from the auxiliary load of the vehicle. Optionally, the responsive action includes proportionally supplementing a voltage available to the vehicle so that as the voltage from the conductive pathway decreases a supplement voltage increases at an about proportional level so that an observed voltage by the vehicle stays about constant. Optionally, the method further includes correlating the drop in the amount of electric current to a conductive gap between the collector device and the conductive pathway. The method may include controlling a rate of change in the electric current received from the conductive pathway upon the vehicle exiting the conductive gap by changing a load-variable electrical resistance of one or more loads of the vehicle prior to the vehicle exiting the conductive gap. The load-variable electrical resistance may be changed by one or more of: (i) increasing a traction load of one or more motors that propel the vehicle; (ii) increasing an auxiliary load of the vehicle; (iii) storing the voltage overshoot in an energy storage device onboard the vehicle; (iv) dissipating the voltage overshoot using a resistive system of the vehicle; or (v) disconnecting a rectifier between the collector device and the one or more motors until the voltage overshoot is no more than a designated voltage threshold. Optionally, the load-variable electrical resistance may be changed by a difference between the electric current conducted along the conductive pathway and a load current demanded by the one or more loads of the vehicle.

Optionally, the method may include detecting the drop in the amount of electric current being conducted from the conductive pathway to the collector device plural times for plural vehicles to identify multiple conductive gaps along the conductive pathway associated with the drops, and determining one or more gap characteristics. The one or more gap characteristics may include at least one of: (i) locations along one or more of the route or the conductive pathway at which the drops in the amount of electric current are detected; (ii) lateral positions along a width of the route at which the collector device is located while the drops in the amount of electric current are detected; (iii) an extension position of the collector device from the vehicle at which the drops in the amount of electric current are detected; (iv) times of day at which the drops in the amount of electric current are detected; (v) identifications of the vehicles that encountered the conductive gaps; (vi) headings of the vehicles that encountered the conductive gaps; (vii) weather conditions where the vehicles encountered the conductive gaps; (viii) rotational speeds of one or more wheels of the vehicles that encountered the conductive gaps; (ix) tractive powers output by one or more motors of the vehicles that encountered the conductive gaps; (x) one or more distances traveled by the vehicles that encountered the conductive gaps while the one or more motors of the vehicles were powered by the electric current from the conductive pathway; or (xi) torque profiles of the one or more motors of the vehicles that encountered the conductive gaps.

The method may include identifying, based on the one or more gap characteristics, a potential cause of the conductive gaps that are identified and associated with one or more of a common location of the locations at which the drops in the amount of electric current are detected, a common vehicle of the plural vehicles, or a common operator of plural operators onboard the plural vehicles. The potential cause of the conductive gaps may be identified as one or more of: (i) degradation of a roadbed of the route; (ii) displacement of the conductive pathway; (iii) failure of the collector device of one or more of the vehicles to exert at least a threshold force on the conductive pathway; (iv) contamination on the conductive pathway; or (v) degraded operation of a vehicle suspension.

The method may include, based on the one or more gap characteristics, one or more of: (i) automatically controlling operation of an approaching vehicle that is traveling toward at least one of the locations of the conductive gaps that are identified to avoid a reduction in pathway voltage that is conducted from the conductive pathway to one or more motors of the approaching vehicle; (ii) notifying an operator of the approaching vehicle that is traveling toward the at least one of the locations of the conductive gaps; (iii) directing maintenance, inspection, or repair of the conductive pathway at the at least one of the locations of the conductive gaps; (iv) directing maintenance, inspection, or repair of the collector device of one or more of the vehicles that encountered the conductive gaps; (v) directing maintenance, inspection, or repair of a vehicle suspension of one or more of the vehicles that encountered the conductive gaps; or (vi) directing maintenance, inspection, or repair of a roadbed of the route at the at least one of the locations of the conductive gaps. Optionally, the vehicle is a first vehicle, and the method further includes: determining a location of the conductive gap that was encountered by the first vehicle, and one or more of: (i) notifying a second vehicle of the location of the conductive gap prior to the second vehicle reaching the location of the conductive gap; (ii) powering one or more motors of the second vehicle using an onboard source of power of the second vehicle while conditioning the conductive pathway with the collector device during travel of the second vehicle through the location of the conductive gap; (iii) powering one or more motors of the second vehicle using the onboard source of power of the second vehicle while keeping the collector device separated from the conductive pathway during travel of the second vehicle through the location of the conductive gap; (iv) increasing an onboard voltage supplied by the onboard source of power of the second vehicle during travel of the second vehicle through the location of the conductive gap; (v) reducing a moving speed of the second vehicle prior to the second vehicle reaching the location of the conductive gap; (vi) reducing a torque output by the one or more motors of the second vehicle prior to the second vehicle reaching the location of the conductive gap; (vii) laterally moving the second vehicle prior to the second vehicle reaching the location of the conductive gap; or (viii) regulating a link voltage of the second vehicle during travel of the second vehicle through the location of the conductive gap. Optionally, the method may include identifying a conductive gap in the conductive pathway by monitoring the electric current conducted along the conductive pathway and sensing the drop in the amount of electric current being conducted from the conductive pathway to the collector device.

In at least one embodiment, a method is provided that involves a conductive pathway extending along a route traveled by a vehicle and a collector device onboard the vehicle and conductively couplable to the conductive pathway. The method may include monitoring electric current conducted from the conductive pathway to the collector device, and detecting a conductive gap in the conductive pathway based on a drop in the electric current that is monitored.

Optionally, the method includes initiating a responsive action with the vehicle responsive to detecting the conductive gap. The responsive action may include one or more of (i) supplanting pathway voltage previously conducted to a drive system of the vehicle prior to encountering the conductive gap with regenerated voltage generated by one or more components of the vehicle, (ii) reducing one or more loads of the vehicle, (iii) supplanting the pathway voltage with battery voltage stored in one or more battery cells or capacitor banks, or (iv) supplanting the pathway voltage with fuel cell voltage generated by one or more fuel cells.

In at least one embodiment, a system includes a collector device and one or more processors. The collector device may be disposed onboard a vehicle that travels along a route and is conductively couplable to a conductive pathway extending along the route. The one or more processors may detect a drop in an amount of electric current being conducted from the conductive pathway to the collector device and respond to the drop in the amount of electric current with a responsive action prior to or during a subsequent drop in voltage being conducted from the conductive pathway to the collector device.

Optionally, the one or more processors may identify a conductive gap between the collector device and the conductive pathway based on the drop in the amount of electric current. The conductive gap may include one or more of: (i) a temporary spatial separation of the collector device from the conductive pathway; (ii) an ice patch on the conductive pathway; (iii) a debris patch on the conductive pathway; (iv) a section of the conductive pathway associated with increased electrical resistance or reduced conduction of the electric current; or (v) a deteriorated or corroded section of the conductive pathway.

The one or more processors may control a rate of change in the electric current received from the conductive pathway upon the vehicle exiting the conductive gap by changing a load-variable electrical resistance of one or more loads of the vehicle prior to the vehicle exiting the conductive gap. The one or more processors may change the load-variable resistance by one or more of: (i) increasing a traction load of one or more motors that propel the vehicle; (ii) increasing an auxiliary load of the vehicle; (iii) storing the voltage overshoot in an energy storage device onboard the vehicle; (iv) dissipating the voltage overshoot using a resistive system of the vehicle; or (v) disconnecting a rectifier between the collector device and the one or more motors until the voltage overshoot is no more than a designated voltage threshold. The one or more processors may change the load-variable electrical resistance by a difference between the electric current conducted along the conductive pathway and a load current demanded by the one or more loads of the vehicle.

Optionally, the vehicle is a first vehicle, and the one or more processors may determine a location in the conductive pathway of the conductive gap that was encountered by the first vehicle. The one or more processors may communicate with a second vehicle to one or more of: (i) notify the second vehicle of the location of the conductive gap prior to the second vehicle reaching the location of the conductive gap; (ii) power one or more motors of the second vehicle using an onboard source of power of the second vehicle while conditioning the conductive pathway with the collector device during travel of the second vehicle through the location of the conductive gap; (iii) power one or more motors of the second vehicle using the onboard source of power of the second vehicle while keeping the collector device separated from the conductive pathway during travel of the second vehicle through the location of the conductive gap; (iv) increase an onboard voltage supplied by the onboard source of power of the second vehicle during travel of the second vehicle through the location of the conductive gap; (v) reduce a moving speed of the second vehicle prior to the second vehicle reaching the location of the conductive gap; (vi) reduce a torque output by the one or more motors of the second vehicle prior to the second vehicle reaching the location of the conductive gap; (vii) laterally move the second vehicle prior to the second vehicle reaching the location of the conductive gap; or (viii) regulate a link voltage of the second vehicle during travel of the second vehicle through the location of the conductive gap.

The one or more processors may detect the drop in the amount of electric current being conducted from the conductive pathway to the collector device plural times for plural vehicles to identify multiple conductive gaps along the conductive pathway associated with the drops. The one or more processors may determine one or more gap characteristics that include at least one of: (i) locations along one or more of the route or the conductive pathway at which the drops in the amount of electric current are detected; (ii) lateral positions along a width of the route at which the collector device is located while the drops in the amount of electric current are detected; (iii) an extension position of the collector device from the vehicle at which the drops in the amount of electric current are detected; (iv) times of day at which the drops in the amount of electric current are detected; (v) identifications of the vehicles that encountered the conductive gaps; (vi) headings of the vehicles that encountered the conductive gaps; (vii) weather conditions where the vehicles encountered the conductive gaps; (viii) rotational speeds of one or more wheels of the vehicles that encountered the conductive gaps; (ix) tractive powers output by one or more motors of the vehicles that encountered the conductive gaps; (x) one or more distances traveled by the vehicles that encountered the conductive gaps while the one or more motors of the vehicles were powered by the electric current from the conductive pathway; or (xi) torque profiles of the one or more motors of the vehicles that encountered the gaps. Optionally, the one or more processors may identify, based on the one or more gap characteristics, a potential cause of the conductive gaps that are identified and associated with one or more of a common location of the locations at which the drops in the amount of electric current are detected, a common vehicle of the plural vehicles, or a common operator of plural operators onboard the plural vehicles.

The one or more processors may identify, based on the one or more gap characteristics, the potential cause of the conductive gaps as one or more of: (i) degradation of a roadbed of the route; (ii) displacement of the conductive pathway; (iii) failure of the collector device of one or more of the vehicles to exert at least a threshold force on the conductive pathway; (iv) contamination on the conductive pathway; or (v) degraded operation of a vehicle suspension.

The one or more processors may analyze the one or more gap characteristics and one or more of: (i) automatically control operation of an approaching vehicle that is traveling toward at least one of the locations of the conductive gaps that are identified to avoid a reduction in pathway voltage that is conducted from the conductive pathway to one or more motors of the approaching vehicle; (ii) notify an operator of the approaching vehicle that is traveling toward the at least one of the locations of the conductive gaps; (iii) direct maintenance, inspection, or repair of the conductive pathway at the at least one of the locations of the conductive gaps; (iv) direct maintenance, inspection, or repair of the collector device of one or more of the vehicles that encountered the conductive gaps; (v) direct maintenance, inspection, or repair of a vehicle suspension of one or more of the vehicles that encountered the conductive gaps; or (vi) direct maintenance, inspection, or repair of a roadbed of the route at the at least one of the locations of the conductive gaps.

Optionally, the one or more processors may proportionally supplement, as the responsive action, a voltage available to the vehicle so that as the voltage from the conductive pathway decreases a supplement voltage increases at an about proportional level so that an observed voltage by the vehicle stays about constant. The one or more processors may initiate, as the responsive action, one or more of: (i) generation of electric current from at least one motor that propels the vehicle; (ii) closing of a circuit to provide electric current from an energy source disposed onboard of the vehicle (the energy source including one or more of a fuel cell, a battery, or a capacitor); (iii) reduction of an auxiliary load of the vehicle; or (iv) generation of supplemental electric current from the auxiliary load of the vehicle. Optionally, the system may also include a current sensor operably coupled to the one or more processors and configured to monitor the electric current conducted from the conductive pathway to the collector device. The one or more processors may detect the drop in the amount of electric current being conducted from the conductive pathway to the collector device based on sensor signals generated by the current sensor.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A method involving a conductive pathway extending along a route traveled by a vehicle and a collector device onboard the vehicle that is conductively couplable to the conductive pathway, the method comprising:
responding to a detected drop in an amount of electric current being conducted from the conductive pathway to the collector device with a responsive action prior to or during a subsequent drop in voltage being conducted from the conductive pathway to the collector device; and
correlating the drop in the amount of electric current to a conductive gap between the collector device and the conductive pathway.

2. The method of claim 1, wherein the responsive action includes one or more of:
generating electric current from at least one motor that propels the vehicle;
closing a circuit to provide electric current from an energy source disposed onboard of the vehicle;
reducing an auxiliary load of the vehicle; or
generating supplemental electric current from the auxiliary load of the vehicle.

3. The method of claim 1, wherein the responsive action includes proportionally supplementing a voltage available to the vehicle so that as the voltage from the conductive pathway decreases a supplement voltage increases at an about proportional level so that an observed voltage by the vehicle stays about constant.

4. The method of claim 1, further comprising controlling a rate of change in the electric current received from the conductive pathway upon the vehicle exiting the conductive gap by changing a load-variable electrical resistance of one or more loads of the vehicle prior to the vehicle exiting the conductive gap.

5. The method of claim 4, wherein the load-variable electrical resistance is changed by one or more of:
increasing a traction load of one or more motors that propel the vehicle;
increasing an auxiliary load of the vehicle;
storing the voltage overshoot in an energy storage device onboard the vehicle;
dissipating the voltage overshoot using a resistive system of the vehicle; or
disconnecting a rectifier between the collector device and the one or more motors until the voltage overshoot is no more than a designated voltage threshold.

6. The method of claim 4, wherein the load-variable electrical resistance is changed by a difference between the electric current conducted along the conductive pathway and a load current demanded by the one or more loads of the vehicle.

7. The method of claim 1, further comprising:
detecting the drop in the amount of electric current being conducted from the conductive pathway to the collector device plural times for plural vehicles to identify multiple conductive gaps along the conductive pathway associated with the drops; and
determining one or more gap characteristics that include at least one of:
locations along one or more of the route or the conductive pathway at which the drops in the amount of electric current are detected;
lateral positions along a width of the route at which the collector device is located while the drops in the amount of electric current are detected;
an extension position of the collector device from the vehicle at which the drops in the amount of electric current are detected;
times of day at which the drops in the amount of electric current are detected;
identifications of the vehicles that encountered the conductive gaps;
headings of the vehicles that encountered the conductive gaps;
weather conditions where the vehicles encountered the conductive gaps;
rotational speeds of one or more wheels of the vehicles that encountered the conductive gaps;
tractive powers output by one or more motors of the vehicles that encountered the conductive gaps;
one or more distances traveled by the vehicles that encountered the conductive gaps while the one or more motors of the vehicles were powered by the electric current from the conductive pathway;
suspension pressures within a suspension system of the vehicles that encountered the conductive gaps;
tilt profiles, including at least one of yaw, pitch, or roll, of the vehicles that encountered the conductive gaps; or
torque profiles of the one or more motors of the vehicles that encountered the conductive gaps.

8. The method of claim 7, further comprising identifying, based on the one or more gap characteristics, a potential cause of the conductive gaps that are identified and associated with one or more of a common location of the locations at which the drops in the amount of electric current are detected, a common vehicle of the plural vehicles, or a common operator of plural operators onboard the plural vehicles.

9. The method of claim 8, wherein the potential cause of the conductive gaps is identified as one or more of:
degradation of a roadbed of the route;
displacement of the conductive pathway;
failure of the collector device of one or more of the vehicles to exert at least a threshold force on the conductive pathway;
contamination on the conductive pathway; or
degraded operation of a vehicle suspension.

10. The method of claim 7, further comprising, based on the one or more gap characteristics, one or more of:
automatically controlling operation of an approaching vehicle that is traveling toward at least one of the locations of the conductive gaps that are identified to avoid a reduction in pathway voltage that is conducted from the conductive pathway to one or more motors of the approaching vehicle;

notifying an operator of the approaching vehicle that is traveling toward the at least one of the locations of the conductive gaps;

directing maintenance, inspection, or repair of the conductive pathway at the at least one of the locations of the conductive gaps;

directing maintenance, inspection, or repair of the collector device of one or more of the vehicles that encountered the conductive gaps;

directing maintenance, inspection, or repair of a vehicle suspension of one or more of the vehicles that encountered the conductive gaps; or directing maintenance, inspection, or repair of a roadbed of the route at the at least one of the locations of the conductive gaps.

11. The method of claim 1, wherein the vehicle is a first vehicle, and further comprising:

determining a location of the conductive gap that was encountered by the first vehicle; and one or more of:

notifying a second vehicle of the location of the conductive gap prior to the second vehicle reaching the location of the conductive gap;

powering one or more motors of the second vehicle using an onboard source of power of the second vehicle while conditioning the conductive pathway with the collector device during travel of the second vehicle through the location of the conductive gap;

powering one or more motors of the second vehicle using the onboard source of power of the second vehicle while keeping the collector device separated from the conductive pathway during travel of the second vehicle through the location of the conductive gap;

increasing an onboard voltage supplied by the onboard source of power of the second vehicle during travel of the second vehicle through the location of the conductive gap;

reducing a moving speed of the second vehicle prior to the second vehicle reaching the location of the conductive gap;

reducing a torque output by the one or more motors of the second vehicle prior to the second vehicle reaching the location of the conductive gap;

laterally moving the second vehicle prior to the second vehicle reaching the location of the conductive gap; or regulating a link voltage of the second vehicle during travel of the second vehicle through the location of the conductive gap.

12. The method of claim 1, further comprising identifying a conductive gap in the conductive pathway by monitoring the electric current conducted along the conductive pathway and sensing the drop in the amount of electric current being conducted from the conductive pathway to the collector device.

13. A method involving a system having a conductive pathway extending along a route traveled by a vehicle and a collector device onboard the vehicle that is selectively conductively couplable to the conductive pathway, the method comprising:

monitoring electric current conducted from the conductive pathway to the collector device; and detecting a conductive gap in the conductive pathway based on a drop in the electric current that is monitored.

14. The method of claim 13, further comprising initiating a responsive action with the vehicle responsive to detecting the conductive gap, the responsive action including one or more of supplanting pathway voltage previously conducted to a drive system of the vehicle prior to encountering the conductive gap with regenerated voltage generated by one or more components of the vehicle, reducing one or more loads of the vehicle, supplanting the pathway voltage with battery voltage stored in one or more battery cells or capacitor banks, or supplanting the pathway voltage with fuel cell voltage generated by one or more fuel cells.

15. A system comprising:

a collector device configured to be disposed onboard a vehicle that travels along a route and conductively couplable to a conductive pathway extending along the route; and one or more processors configured to detect a drop in an amount of electric current being conducted from the conductive pathway to the collector device, and respond to the drop in the amount of electric current with a responsive action prior to or during a subsequent drop in voltage being conducted from the conductive pathway to the collector device, wherein the one or more processors are configured to identify a conductive gap between the collector device and the conductive pathway based on the drop in the amount of electric current, the one or more processors configured to control a rate of change in the electric current received from the conductive pathway upon the vehicle exiting the conductive gap by changing a load-variable electrical resistance of one or more loads of the vehicle prior to the vehicle exiting the conductive gap.

16. The system of claim 15, wherein the vehicle is a first vehicle, and the one or more processors are configured to identify a conductive gap between the collector device and the conductive pathway based on the drop in the amount of electric current, the one or more processors configured to determine a location in the conductive pathway of the conductive gap that was encountered by the first vehicle, the one or more processors configured to communicate with a second vehicle to one or more of:

notify the second vehicle of the location of the conductive gap prior to the second vehicle reaching the location of the conductive gap;

power one or more motors of the second vehicle using an onboard source of power of the second vehicle while conditioning the conductive pathway with the collector device during travel of the second vehicle through the location of the conductive gap;

power one or more motors of the second vehicle using the onboard source of power of the second vehicle while keeping the collector device separated from the conductive pathway during travel of the second vehicle through the location of the conductive gap;

increase an onboard voltage supplied by the onboard source of power of the second vehicle during travel of the second vehicle through the location of the conductive gap;

reduce a moving speed of the second vehicle prior to the second vehicle reaching the location of the conductive gap;

reduce a torque output by the one or more motors of the second vehicle prior to the second vehicle reaching the location of the conductive gap;

laterally move the second vehicle prior to the second vehicle reaching the location of the conductive gap; or regulate a link voltage of the second vehicle during travel of the second vehicle through the location of the conductive gap.

17. The system of claim 15, wherein the one or more processors are configured to proportionally supplement, as the responsive action, a voltage available to the vehicle so that as the voltage from the conductive pathway decreases a supplement voltage increases at an about proportional level so that an observed voltage by the vehicle stays about constant.

18. The system of claim 15, further comprising a current sensor operably coupled to the one or more processors and configured to monitor the electric current conducted from the conductive pathway to the collector device, the one or more processors configured to detect the drop in the amount of electric current being conducted from the conductive pathway to the collector device based on sensor signals generated by the current sensor.

* * * * *